(12) United States Patent
Cerra et al.

(10) Patent No.: US 10,001,080 B2
(45) Date of Patent: Jun. 19, 2018

(54) THRUST REVERSE VARIABLE AREA FAN NOZZLE

(71) Applicant: The Boeing Company, Chicago, IL (US)

(72) Inventors: David F. Cerra, Woodinville, WA (US); Robert H. Willie, Bothell, WA (US)

(73) Assignee: The Boeing Company, Chicago, IL (US)

( * ) Notice: Subject to any disclaimer, the term of this patent is extended or adjusted under 35 U.S.C. 154(b) by 424 days.

(21) Appl. No.: 14/462,682

(22) Filed: Aug. 19, 2014

(65) Prior Publication Data

US 2016/0053718 A1    Feb. 25, 2016

(51) Int. Cl.
| | |
|---|---|
| *F02K 1/72* | (2006.01) |
| *F02K 1/12* | (2006.01) |
| *F02K 3/02* | (2006.01) |
| *F02K 1/76* | (2006.01) |
| *F02K 1/70* | (2006.01) |
| *F02K 1/11* | (2006.01) |

(52) U.S. Cl.
CPC .................. *F02K 1/72* (2013.01); *F02K 1/11* (2013.01); *F02K 1/12* (2013.01); *F02K 1/1207* (2013.01); *F02K 1/70* (2013.01); *F02K 1/763* (2013.01); *F02K 3/025* (2013.01); *F05D 2260/50* (2013.01)

(58) Field of Classification Search
CPC ..... F02K 1/70; F02K 1/72; F02K 1/76; F02K 1/64; F02K 1/06; F02K 1/30; F02K 1/08–1/12; F02K 3/02; F02K 1/60; F02K 1/62; F02K 1/1207; F02K 3/025
USPC .............................................. 60/226.1–226.3
See application file for complete search history.

(56) References Cited

U.S. PATENT DOCUMENTS 3,570,247 A * 3/1971 Denning .................. F02K 1/58
                                                239/265.19
4,093,122 A * 6/1978 Linderman ............... F02K 1/11
                                                239/127.3

(Continued)

FOREIGN PATENT DOCUMENTS

| RU | 2 425 242 | | 7/2011 |
|---|---|---|---|
| RU | 2425242 C1 | * | 7/2011 |
| WO | WO 2008/045070 | | 4/2008 |

OTHER PUBLICATIONS

Extended European Search Report, EP 15 18 1071 (dated Jan. 15, 2016).

*Primary Examiner* — Gerald L Sung
*Assistant Examiner* — Alain Chau
(74) *Attorney, Agent, or Firm* — Walters & Wasylyna LLC (57) ABSTRACT

A thrust reverse variable area nozzle system for a nacelle of an aircraft engine system may include a reverse thrust opening disposed in the nacelle, and a thrust reverser door pivotally movable relative to the nacelle for selectively covering the reverse thrust opening, wherein the thrust reverser door is pivotally movable between a first position for completely covering the reverse thrust opening, a second position for partially uncovering a forward portion of the reverse thrust opening and discharging a bypass airflow through the forward portion of the reverse thrust opening in a forward direction, and a third position for partially uncovering an aft portion of the reverse thrust opening and discharging the bypass airflow through the aft portion of the reverse thrust opening in an aft direction.

20 Claims, 10 Drawing Sheets (56) References Cited

U.S. PATENT DOCUMENTS

| | | | |
|---|---|---|---|
| 4,194,692 A | 3/1980 | Dickenson | |
| 4,865,256 A | 9/1989 | Durand et al. | |
| 6,938,408 B2 * | 9/2005 | Lair | B64C 15/02 |
| | | | 239/265.33 |
| 8,151,551 B2 | 4/2012 | Pero | |
| 2012/0023900 A1 * | 2/2012 | Flin | B64D 29/06 |
| | | | 60/226.2 |

* cited by examiner

THRUST REVERSE VARIABLE AREA FAN NOZZLE

FIELD

The present disclosure is generally related to aircraft engine systems and, more particularly, to an aircraft engine system having a thrust reverse variable area fan nozzle.

BACKGROUND

Gas turbine engines, also known as jet engines, may be used for power generation and propulsion of a vehicle (e.g., an aircraft). The engine may include a compression section, a combustion section, and a turbine section that utilize a primary airflow into the engine to generate power or propel the vehicle. The engine may be mounted within a housing (e.g., a nacelle of the aircraft). A bypass airflow passage may be defined between the housing and the engine. A bypass airflow may flow through the bypass airflow passage and exit from an outlet of the housing.

As engine bypass ratios increase, it may become increasingly difficult to maintain a suitable bypass pressure ratio, for example, to avoid fan flutter of the engine. Variable area fan nozzle systems may be used to maintain a desired pressure ratio, however, such systems tend to be very complicated and add additional weight to the aircraft.

Thrust reversers may be used to generate a reverse thrust force to slow forward movement of the aircraft. One type of thrust reverser may utilize a moveable door located near a rear of the nacelle. The door may move into the bypass airflow passage to deflect the bypass airflow radially outwards through a reverse thrust opening to direct a discharge airflow in a forward direction to slow the aircraft. Although thrust reversers effectively slow the aircraft, thrust reversers typically serve only that purpose and do not provide any additional functionality when not in use.

Accordingly, those skilled in the art continue with research and development efforts in the field of controlling the bypass airflow through the aircraft engine system.

SUMMARY

In one embodiment, the disclosed thrust reverse variable area nozzle system for a nacelle of an aircraft engine system may include a reverse thrust opening disposed in the nacelle, and a thrust reverser door pivotally movable relative to the nacelle for selectively covering the reverse thrust opening, wherein the thrust reverser door is pivotally movable between a first position for completely covering the reverse thrust opening, a second position for partially uncovering a forward portion of the reverse thrust opening and discharging a bypass airflow through the forward portion of the reverse thrust opening in a forward direction, and a third position for partially uncovering an aft portion of the reverse thrust opening and discharging the bypass airflow through the aft portion of the reverse thrust opening in an aft direction.

In another embodiment, the disclosed engine system for an aircraft may include an engine, a nacelle including an inner cowling extending circumferentially around the engine and an outer cowling extending circumferentially around the inner cowling, a bypass airflow passage defined between the inner cowling and the outer cowling, a reverse thrust opening disposed in the outer cowling and in fluid communication with the bypass airflow passage, and a thrust reverser door pivotally movable relative to the outer cowling for selectively covering the reverse thrust opening, the thrust reverser door including a forward end and an opposed aft end, wherein the thrust reverser door is pivotally movable between a first position for completely covering the reverse thrust opening, a second position for partially uncovering a forward portion of the reverse thrust opening and positioning the aft end of the thrust reverser door within the bypass airflow passage to discharge a bypass airflow through the forward portion of the reverse thrust opening in a forward direction, and a third position for partially uncovering an aft portion of the reverse thrust opening to increase a cross-sectional area of the bypass airflow passage and discharge the bypass airflow through the aft portion of the reverse thrust opening in an aft direction.

In yet another embodiment, the disclosed method controlling a bypass airflow through a nacelle of an aircraft engine system may include the steps of: (1) positioning a thrust reverser door in a first position relative to the nacelle to allow the bypass airflow to flow through a bypass airflow passage of the nacelle and be completely discharged through a rear exhaust of the nacelle, (2) pivoting the thrust reverser door to a second position relative to the nacelle to at least partially restrict the bypass airflow passage and discharge at least a portion of the bypass airflow in a forward direction through a reverse thrust opening in the nacelle, and (3) pivoting the thrust reverser door to a third position relative to the nacelle to increase a cross-sectional area of the bypass airflow passage and discharge the bypass airflow in an aft direction through the reverse thrust opening and the rear exhaust of the nacelle.

Other embodiments of the disclosed systems and method will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
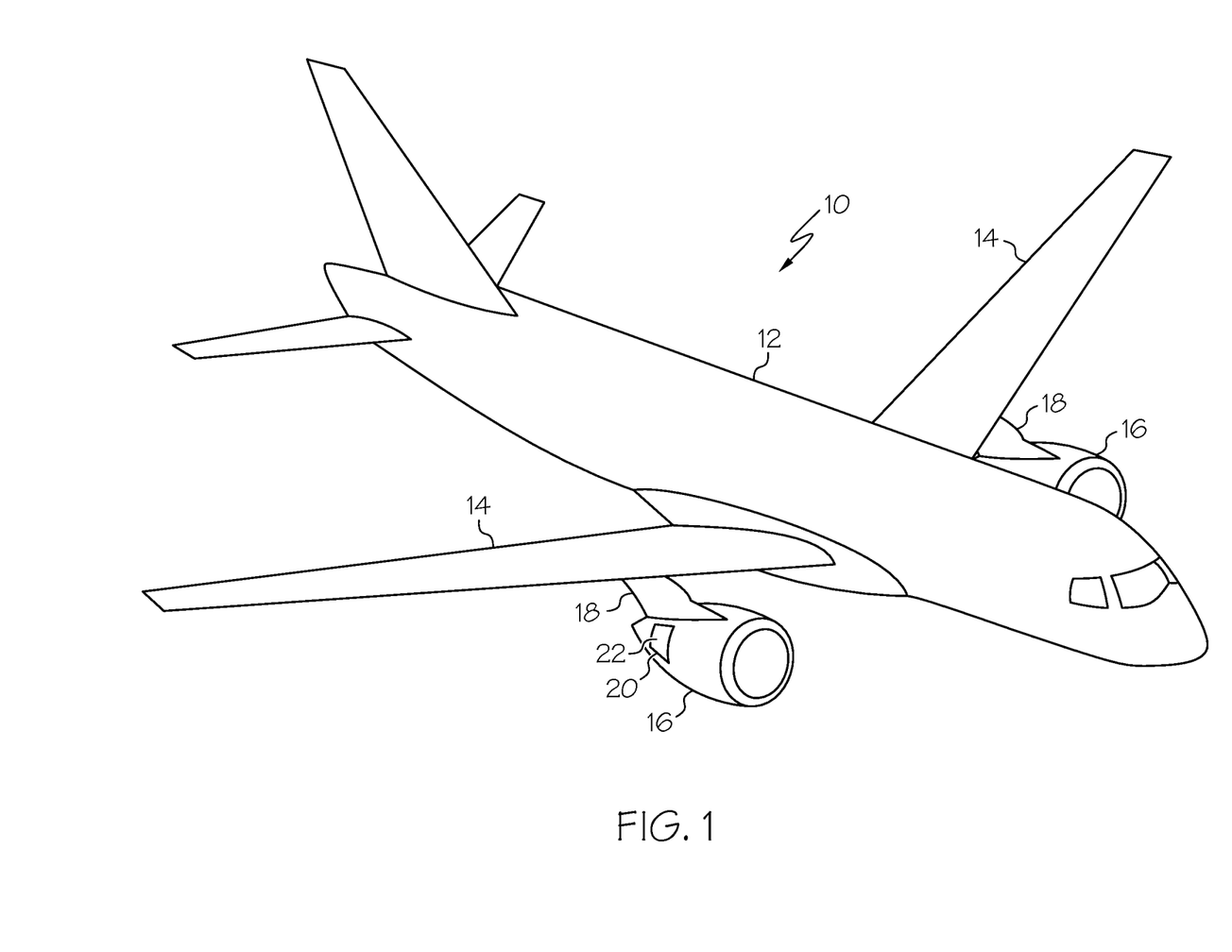
FIG. 1 is a schematic perspective view of one embodiment of the disclosed aircraft.

Referring to FIG. 1, one embodiment of the disclosed aircraft 10 may include a fuselage 12 and a pair of wings 14. Each wing 14 may extend outward from the fuselage 12. At least one nacelle 16 may be coupled to an underside of each wing 14. For example, each nacelle 16 may be coupled to the wing 14 by at least one pylon 18. The pylon 18 may be capable of coupling the nacelle 16 to the wing 14 and supporting the nacelle 16.

Figure 2:
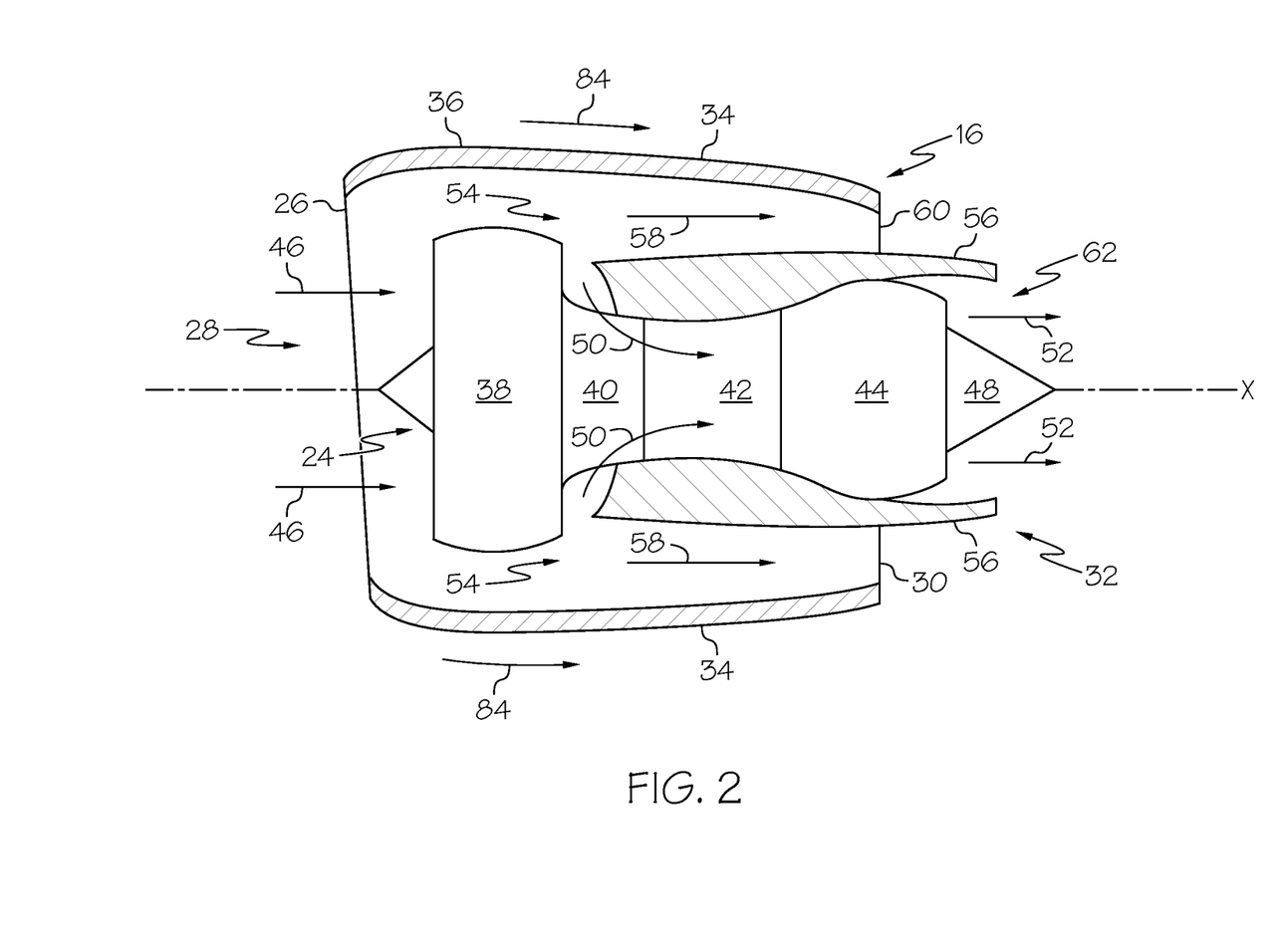
FIG. 2 is a schematic side elevational view of one embodiment of the engine system of the aircraft.

Referring to FIG. 2, the nacelle 16 may include an inlet 26 proximate (e.g., at or near) a first (e.g., forward) end 28 of the nacelle 16 and an opposed (e.g., in a longitudinal direction) outlet 30 proximate a second (e.g., aft) end 32 of the nacelle 16. As used herein, the terms forward and aft may be considered relative to a direction of movement of the aircraft 10 (FIG. 1).

One or more outer cowlings 34 may be joined together to form the nacelle 16. For example, an exterior surface (e.g., outer mold line) 36 of the nacelle 16 may be formed by the outer cowling 34 extending from the forward end 28 to the aft end 32 of the nacelle 16. During flight, an airflow 46 may flow through the inlet 26 of the nacelle 16 as well as over the exterior surface 36 of the nacelle 16.

The nacelle 16 may house an aircraft engine 24 (e.g., a jet engine). The engine 24 may be disposed circumferentially about an axial engine centerline X. The outer cowling 34 of the nacelle 16 may extend circumferentially about the engine 24.

Generally, the engine 24 may include a fan 38, at least one compressor 40, at least one combustion chamber 42, at least one turbine 44, and a nozzle 48 (e.g., a tail cone). The fan 38 may be disposed proximate the inlet 26 of the nacelle 16. The engine 24 may receive at least a portion of the airflow 46 (e.g., a primary airflow 50) through the fan 38. Air compressed in the compressor 40 may be mixed with fuel that is burned in the combustion chamber 42 and expanded in the turbine 44. An exhaust jet 52 may exit through the rear-facing nozzle 48 disposed proximate the outlet 30 of the nacelle 16 to propel the aircraft 10 (FIG. 1) in a forward direction.

For example, the engine 24 may be a high bypass ratio turbojet engine. A generally annular bypass airflow passage 54 (e.g., a duct) may extend between the nacelle 16 and the engine 24. For example, an inner cowling 56 may define an exterior housing of the engine 24 (e.g., the exterior housing of the compressor 40, the combustion chamber 42, and the turbine 44). The bypass airflow passage 54 may be defined by and extend between the outer cowling 34 of the nacelle 16 and the inner cowling 56 of the engine 24. The bypass airflow passage 54 may extend along the centerline X (e.g., in a longitudinal direction) from the inlet 26 to the outlet 30.

In operation, the fan 38 may draw air from the airflow 46 into the inlet 26 of the nacelle 16. A free stream airflow 84 may flow over the exterior surface 36 of the nacelle 16. A primary airflow 50 may enter the engine 24 and a bypass airflow 58 may enter the bypass airflow passage 54 (e.g., bypassing the engine 24). The nacelle 16 may include a rear exhaust 60 at the outlet 30. The rear exhaust 60 of the nacelle 16 may discharge the bypass airflow 58. The exhaust jet 52 (e.g., discharged from the engine 24) may be discharged from a primary airflow passage 62 defined between the inner cowling 56 and the nozzle 48. A significant amount of thrust may be provided by the bypass airflow 58 due to the high bypass ratio. The bypass airflow 58 may be combined with the exhaust jet 52 to improve fuel efficiency and engine noise.

Referring to FIGS. 3-8, the nacelle 16 may include at least one thrust reverse variable area nozzle system, generally designated 19, for providing a reverse thrust and a variable area fan nozzle forward thrust. The system 19 may include at least one reverse thrust opening 20 disposed in the nacelle 16 and at least one corresponding thrust reverser door 22 for covering each reverse thrust opening 20. In one example, and as best shown in FIGS. 3-8, the system 19 may include a plurality of (e.g., four) reverse thrust openings 20 disposed in the nacelle 16 and a plurality of (e.g., four) corresponding thrust reverser doors 22. For example, two reverse thrust openings 20 and corresponding thrust reverser doors 22 may be located on a first side 64 of the nacelle 16 and two reverse thrust openings 20 and corresponding thrust reverser doors 22 may be located on an opposed (e.g., laterally opposed) second side 66 of the nacelle 16.

In another example, and as best shown in FIG. 1, the system 19 may include one reverse thrust opening 20 disposed in the nacelle 16 and one corresponding thrust reverser door 22. For example, the nacelle 16 may include at least one reverse thrust opening 20 and corresponding thrust reverser door 22 on only one side (e.g., the first side 64 or the second side 66). In another example (not shown), the nacelle 16 may a pair of opposing reverse thrust openings 20 and corresponding thrust reverser doors 22. For example, the nacelle 16 may include a reverse thrust opening 20 and corresponding thrust reverser door 22 on each side (e.g., the first side 64 and the second side 66). In yet another example (not shown), the system 19 may include a plurality (e.g., any number) of reverse thrust openings 20 and corresponding thrust reverser doors 22 disposed circumferentially about the nacelle 16.

Figure 4:
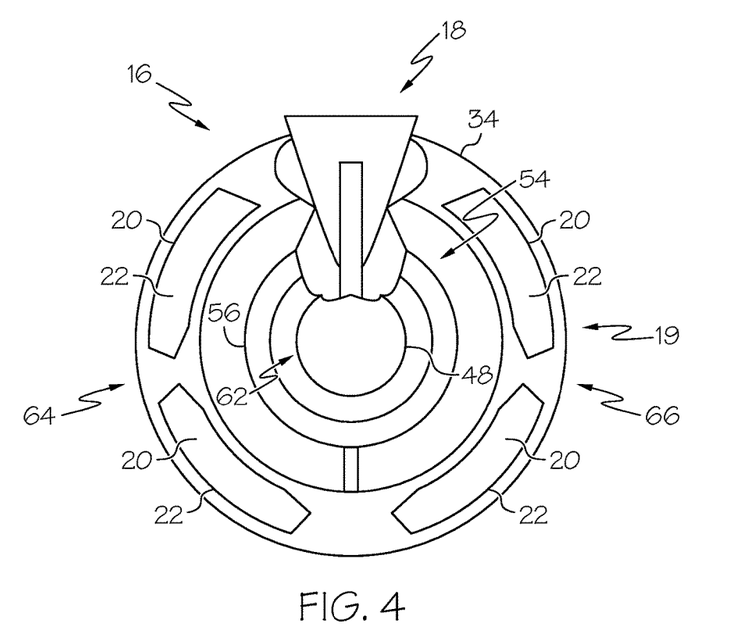
FIG. 4 is a schematic rear elevational view of the nacelle of FIG. 3.
Figure 6:
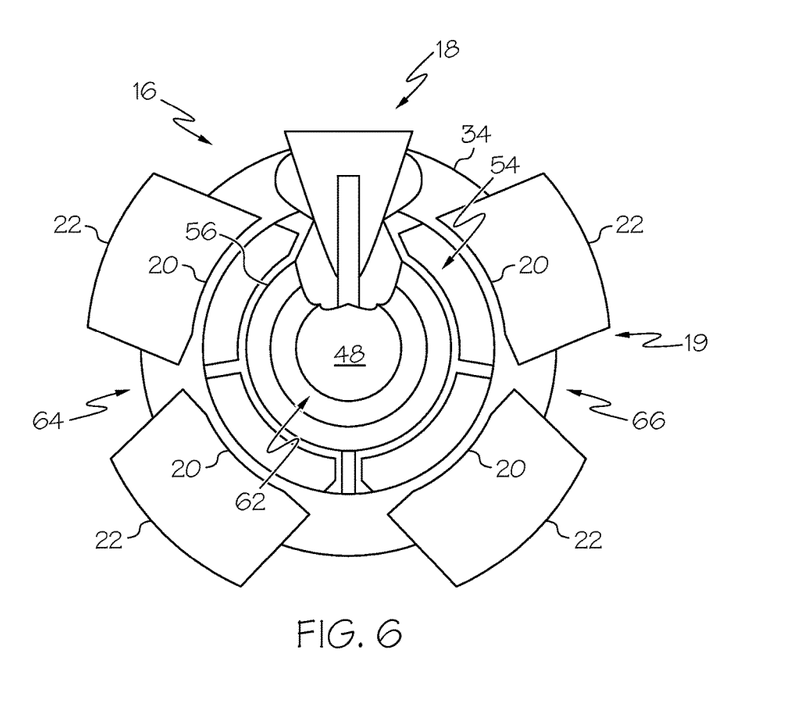
FIG. 6 is a schematic rear elevational view of the nacelle of FIG. 5.
Figure 8:
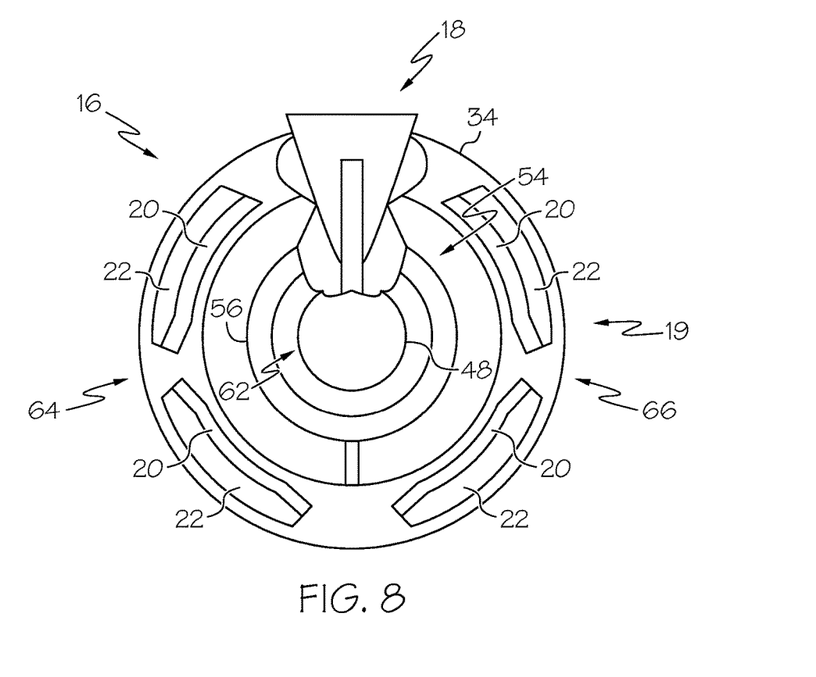
FIG. 8 is a schematic rear elevational view of the nacelle of FIG. 7.

Each reverse thrust opening 20 and corresponding thrust reverser door 22 may be associated with the bypass airflow passage 54 (FIGS. 4, 6 and 8). For example, the reverse thrust opening 20 may be disposed through the outer cowling 34 of the nacelle 16 to define an air discharge vent from the bypass airflow passage 54. In one example construction, the reverse thrust openings 20 may be located forward of a trailing (e.g., aft) edge of the nacelle 16. In another example construction, the reverse thrust openings 20 may be located farther forward of the trailing edge of the nacelle 16. As yet another example construction, the reverse thrust openings 20 may be located at the trailing edge of the nacelle 28.

The thrust reverser doors 22 may be coupled to the nacelle 16. As an example, the thrust reverser doors 22 may be coupled to the outer cowling 34 of the nacelle 16. The thrust reverser door 22 may be movable between a plurality of positions to influence the bypass airflow 58 under certain operational conditions.

The engine 24 may be designed to operate within a desired performance envelope under certain operational conditions, such as cruise, take off, landing, etc. It may be desirable to operate the fan 38 under a desired pressure ratio range (e.g., the ratio of air pressure forward of the fan 38 to air pressure aft of the fan 38), for example, to avoid fan flutter. The position of the thrust reverser door 22 may be used to control the pressure ratio.

Figure 3:
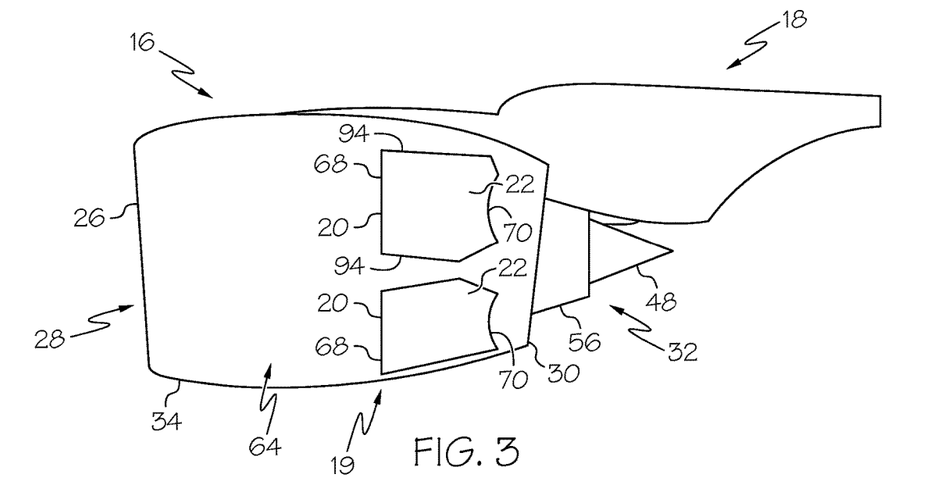
FIG. 3 is a schematic side elevational view of one embodiment of the nacelle of the engine system, illustrating the disclosed thrust reverse variable area nozzle system in a first position.

As best shown in FIGS. 3 and 4, the thrust reverser door 22 may be positioned in a first (e.g., forward thrust) position. The first position may also be the stowed position of the thrust reverser door 22. When in the first position, the thrust reverser door 22 may completely cover the reverse thrust opening 20 and be coplanar with the nacelle 16 (e.g., the outer cowling 34). For example, the first position may be utilized when the aircraft 10 (FIG. 1) is being operated at cruise.

Figure 5:
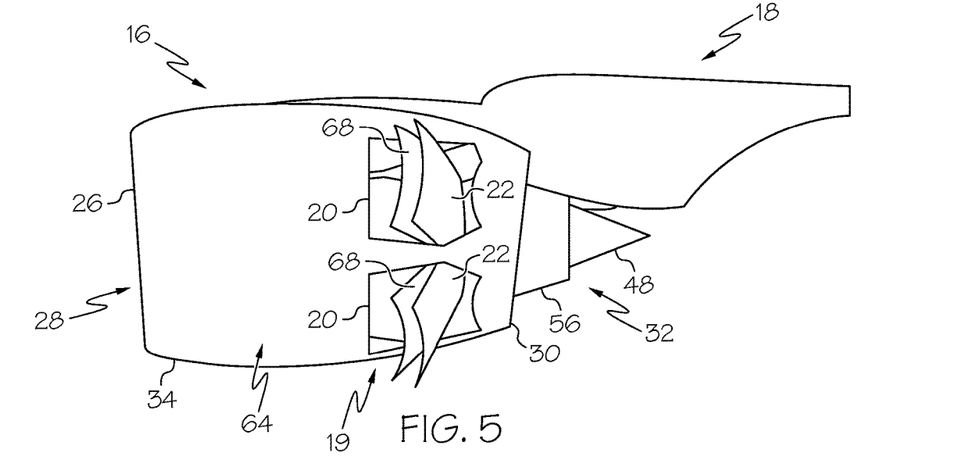
FIG. 5 is a schematic side elevational view of the nacelle, illustrating the thrust reverse variable area nozzle system in a second position.

As best shown in FIGS. 5 and 6, the thrust reverser door 22 may be positioned in a second (e.g., reverse thrust) position. The thrust reverser door 22 may be pivoted such that an aft end 70 (FIG. 3) of the thrust reverser door 22 moves radially inward and a forward end 68 of the thrust reverser door 22 moves radially outward relative to the centerline X to position the thrust reverser door in the second position. When in the second position, the thrust reverser door 22 may at least partially uncover the reverse thrust opening 20 and vary (e.g., reduce) the cross-sectional area of the bypass airflow passage 54 to at least partially restrict the bypass airflow passage 54 and direct the bypass airflow 58 from the bypass airflow passage 54 through the reverse thrust opening 20 (e.g., a forward portion of the reverse thrust opening 20). For example, the second position may be utilized to slow the aircraft 10 (FIG. 1), such as during landing.

Figure 7:
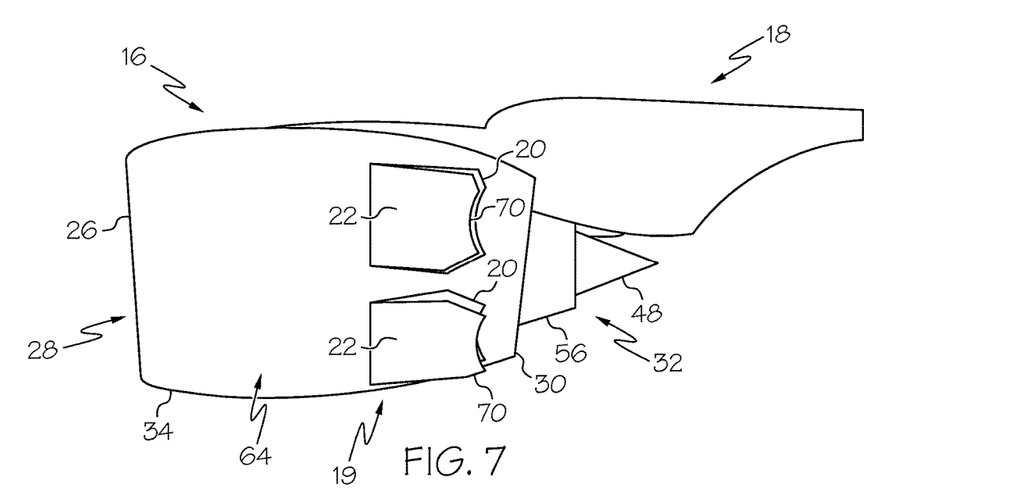
FIG. 7 is a schematic side elevational view of the nacelle, illustrating the thrust reverse variable area nozzle system in a third position.

As best shown in FIGS. 7 and 8, the thrust reverser door 22 may be positioned in a third (e.g., variable area nozzle forward thrust) position. The thrust reverser door 22 may be pivoted such that the forward end 68 (FIG. 3) of the thrust reverser door 22 moves radially inward and the aft end 70 of the thrust reverser door 22 moves radially outward relative to the centerline X to position the thrust reverser door in the third position. When in the third position, the thrust reverser door 22 may at least partially uncover the reverse thrust opening 20 and vary (e.g., increase) the cross-sectional area of the bypass airflow passage 54 to allow the bypass airflow 58 (FIG. 2) from the bypass airflow passage 54 to be discharged through the reverse thrust opening 20 (e.g., the aft portion of the reverse thrust opening 20). For example, the third position may be utilized to increase the bypass airflow 58 exiting the nacelle 16, such as during takeoff.

Figure 9:
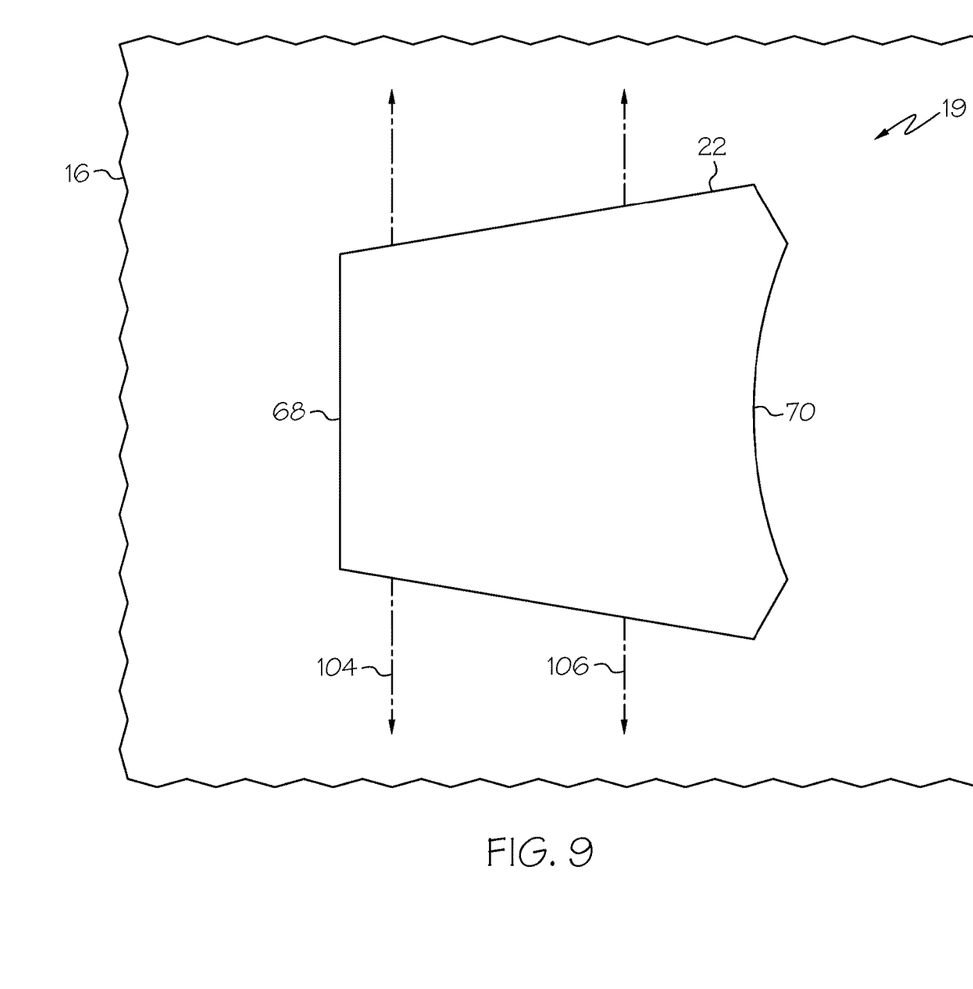
FIG. 9 is a plan view of a thrust reverser door of the disclosed thrust reverse variable area nozzle system.

Referring to FIG. 9, each thrust reverser door 22 may include a pair of spaced apart pivot axes 104, 106. The thrust reverser door 22 may pivot about a forward pivot axis 104 when moving between the first (e.g., forward thrust) position (FIGS. 3 and 4) and the third (e.g., variable nozzle forward thrust) position (FIGS. 7 and 8). The forward pivot axis 104 may be located proximate (e.g., at or near) the forward end 68 (e.g., leading edge) of the thrust reverser door 22. As one example, the forward pivot axis 104 may be located within the first 10 percent of the length of the thrust reverser door 22 (e.g., from the forward end 68 to the aft end 70). As another example, the forward pivot axis 104 may be located within the first 15 percent of the length of the thrust reverser door 22 (e.g., from the forward end 68 to the aft end 70). As yet another example, the forward pivot axis 104 may be located within the first 20 percent of the length of the thrust reverser door 22 (e.g., from the forward end 68 to the aft end 70).

The thrust reverser door 22 may pivot about an aft pivot axis 106 when moving between the first (e.g., forward thrust) position (FIGS. 3 and 4) and the second (e.g., reverse thrust) position (FIGS. 5 and 6). The aft pivot axis 106 may be spaced away from the rear end 70 (e.g., the trailing edge) of the thrust reverser door 22. The location of the aft pivot axis 106 (e.g., relative to the aft end 70) may depend on numerous factors including, but not limited to, the length (e.g., from the forward end 68 to the aft end 70) of the thrust reverser door 22, the size and/or geometry of the bypass airflow passage 54 (FIG. 2), and the like. The aft pivot axis 106 may be located such that the aft end 70 of the thrust reverser door 22 blocks a substantial portion (e.g., at least 50 percent) of the bypass airflow passage 54 when the thrust reverser door 22 is in the second position to redirect a substantial portion (e.g., at least 50 percent) of the bypass airflow 58 (FIG. 2) outwardly through the reverse thrust opening 20, for example, in a forward direction.

Figure 10:
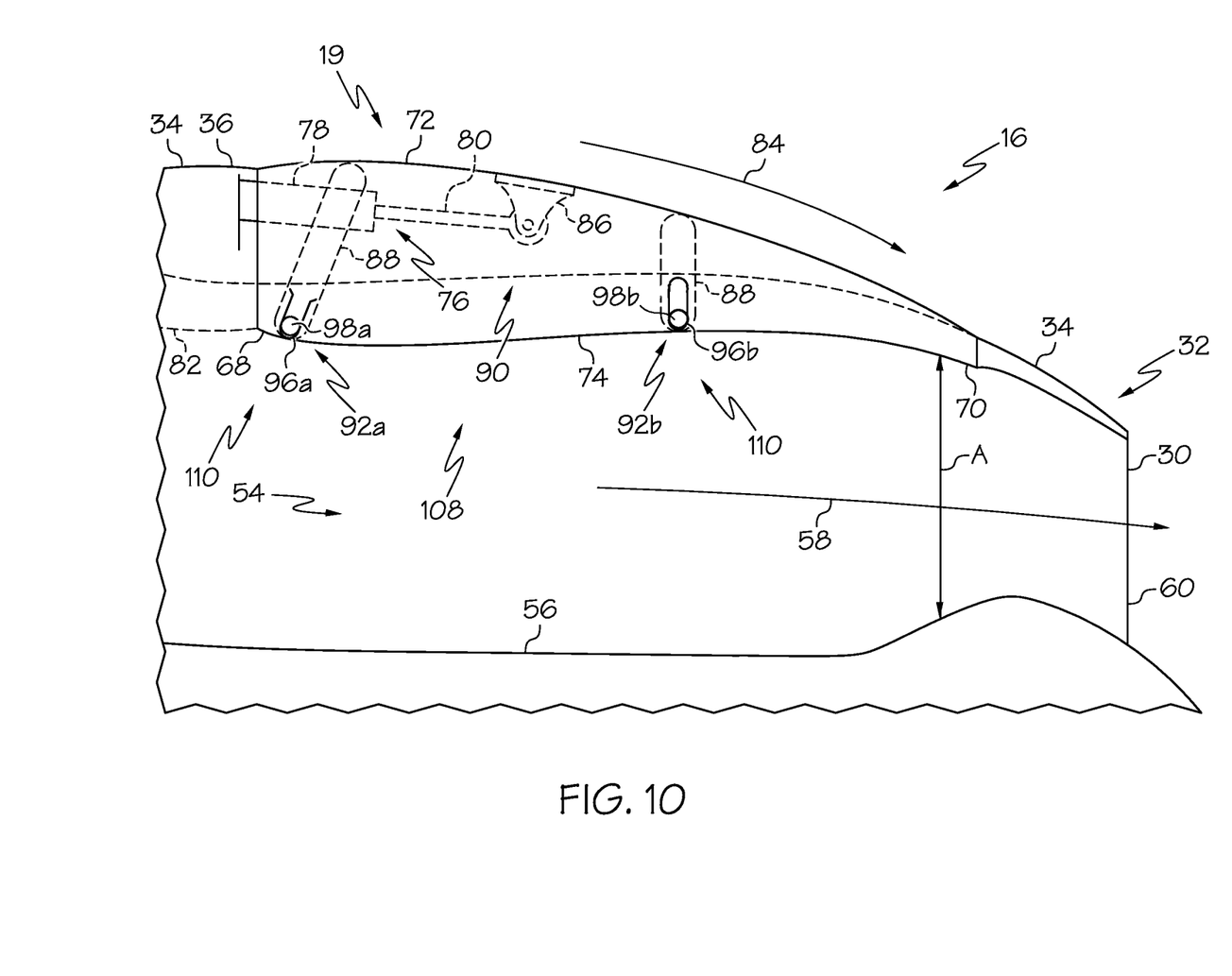
FIG. 10 is a schematic view of the thrust reverse variable area nozzle system shown in the first position.

Referring to FIG. 10, the thrust reverser door 22 may include an outer surface 72 and an inner surface 74. The outer surface 72 may be located radially outward of the inner surface 74 relative to the centerline X (FIG. 2). The outer surface 72 may form a portion of the exterior surface 36 of the nacelle 16 (e.g., the outer cowling 34) when the thrust reverser door 22 is in the first position. The inner surface 74 may form an outward radial boundary of the bypass airflow passage 54 when the thrust reverser door 22 is in the first position.

Figure 11:
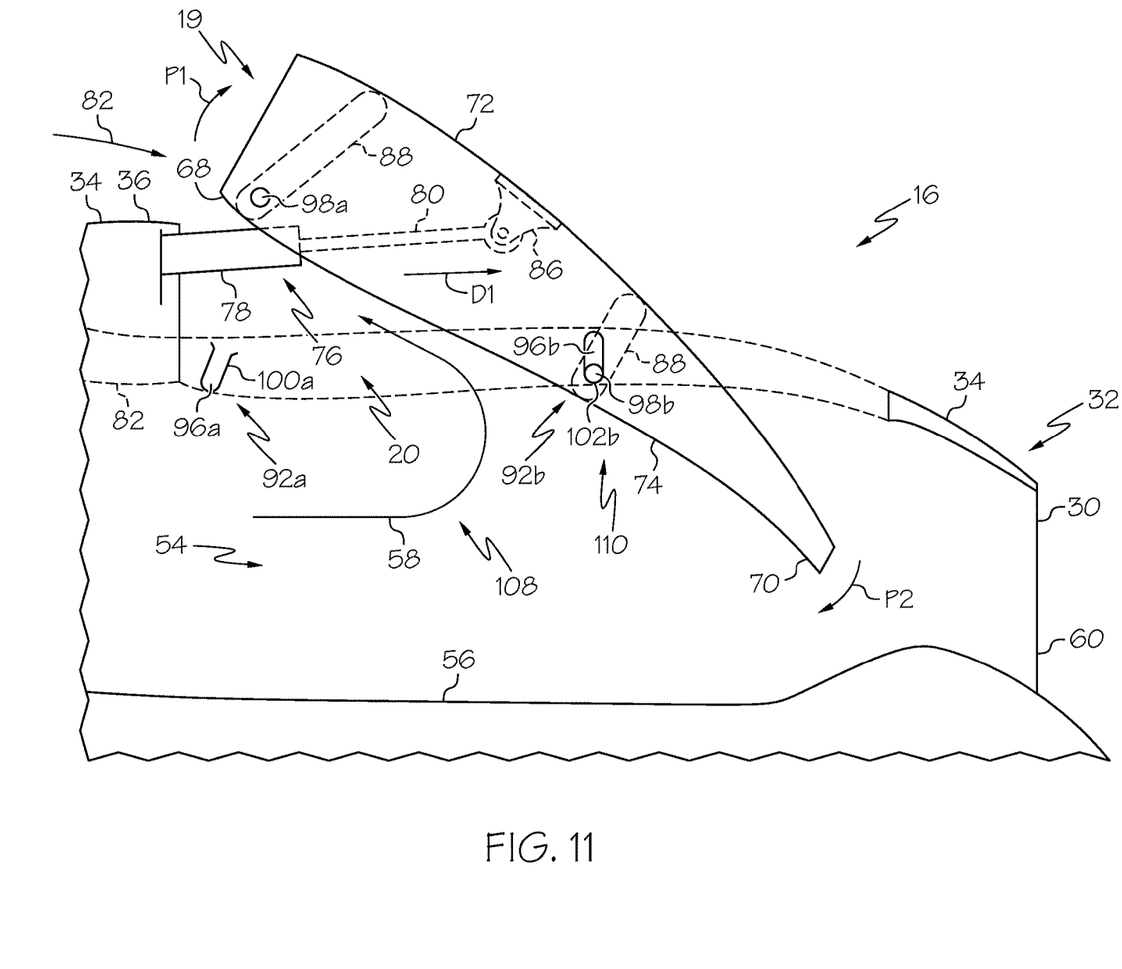
FIG. 11 is a schematic view of the thrust reverse variable area nozzle system shown in the second position.
Figure 12:
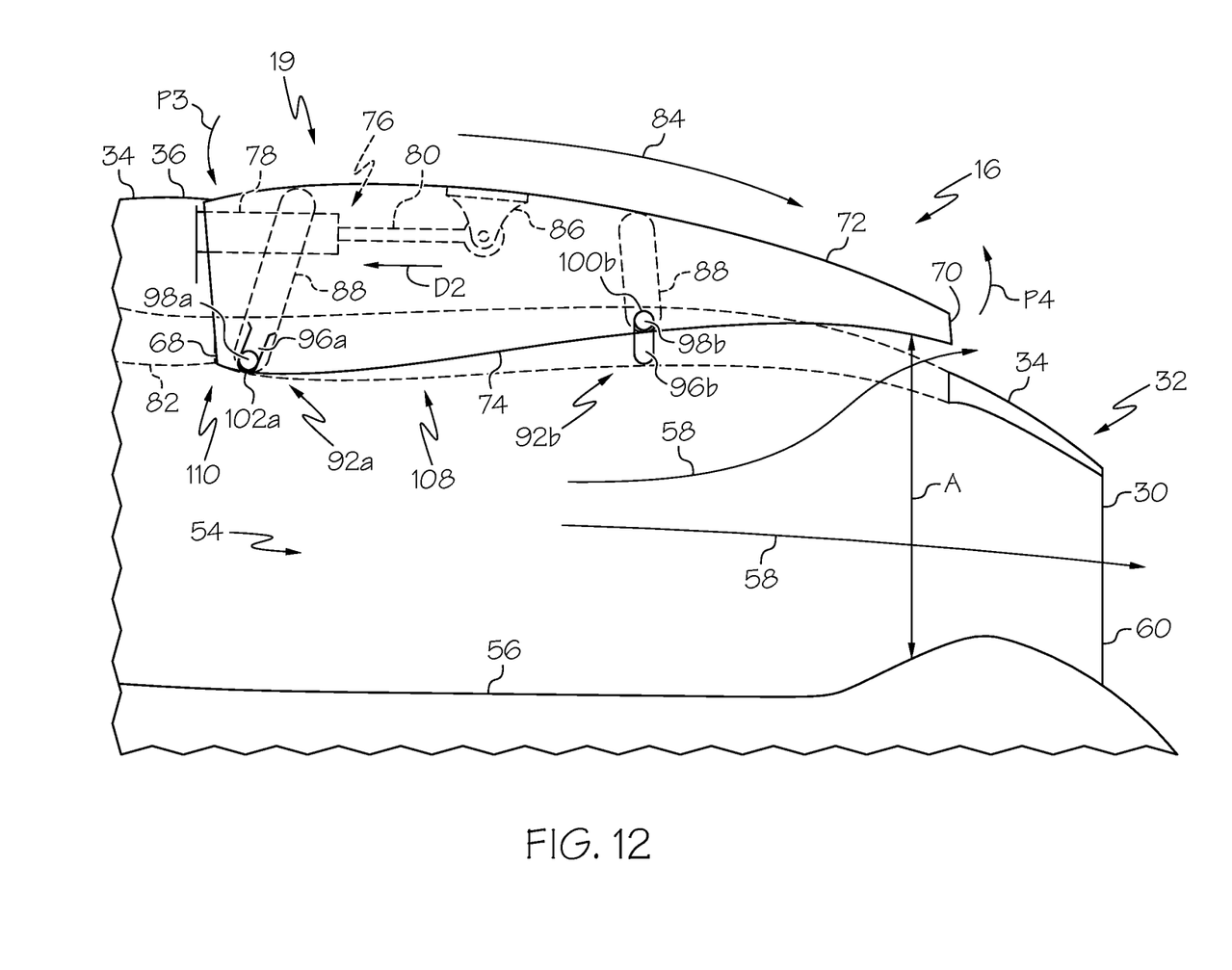
FIG. 12 is a schematic view of the thrust reverse variable area nozzle system shown in the third position.

Referring to FIGS. 10-12, the thrust reverser door 22 may include a pivot mechanism 108 operatively coupled to the thrust reverser door 22 to control the pivoting motion of the thrust reverser door 22 between the plurality of positions (e.g., between the first, second, and third positions). As an example, the pivot mechanism may include at least one actuator 76 for movement of the thrust reverser door 22 between the plurality of positions and at least two pivot connections 110 (e.g., a forward pivot connection defining the forward pivot axis 104 and an aft pivot connection defining the aft pivot axis 106).

A controller (not shown) may be in communication with the actuator 76 for controlling the actuator 76 to selectively move the thrust reverser door 22 between the plurality of positions. The controller may be dedicated to controlling the actuator 76 (and, thus, the thrust reverser door 22), integrated into an existing engine controller within the engine 24, or incorporated with other aircraft or engine controls.

As one example, the actuator 76 may be a linear actuator operably coupled to the thrust reverser door 22. For example, the actuator 76 may include an actuator cylinder 78 and an actuator rod 80 extending from the actuator cylinder 78. The actuator cylinder 78 may retract and extend the actuator rod 80 between a plurality of positions to move the thrust reverser door 22. The thrust reverser door 22 may include a pivot bracket 86. The actuator rod 80 may be operatively coupled to the pivot bracket 86.

The actuator cylinder 78 may include, but is not limited to, a hydraulic cylinder, an electric cylinder, pneumatic cylinder, or the like. The pivot bracket may include, but it not limited to, a clevis mount, a trunnion mount, or the like.

In an example construction, and as best shown in FIGS. 10-12, the nacelle 16 may include a frame 82 that supports the outer cowling 34 and the thrust reverser door 22. The thrust reverser door 22 may include a frame 88 that supports and interconnects the outer surface 72 and inner surface 74 of the thrust reverser door 22. The actuator 76 may be coupled to the frame 82 of the nacelle 16. The pivot bracket 86 may be coupled to an interior face of the outer surface 72 of the thrust reverser door 22. In this example, the actuator 76 and the pivot bracket 86 may be disposed and operate within a space 90 defined between the outer surface 72 and the inner surface 74 of the thrust reverser door 22.

In another example construction (not shown), the actuator 76 may be coupled to the inner cowling 56 of the nacelle 16. The pivot bracket 86 may be coupled to an interior face of the inner surface 74 of the thrust reverser door 22. In this example, the actuator 76 and the pivot bracket 86 may be disposed and operate within the bypass airflow passage 54 defined between the inner surface 74 of the thrust reverser door 22 and the inner cowling 56.

Other mounting locations of the actuator 76 and/or the pivot bracket 86 are also contemplated depending upon the configuration and/or construction of the nacelle 16 and/or the thrust reverser door 22.

The pivot connections 110 may include various structural components and/or complexity. Generally, the pivot connections 110 may suitably connect the thrust reverser door 22 to the nacelle 16 such that the thrust reverser door 22 may pivot about the forward pivot axis 104 and the aft pivot axis 106.

As one example, the pivot connection 110 may include a slide-pivot connection 92. The thrust reverser door 22 may be pivotally connected to the nacelle 16 by a plurality of slide-pivot connections 92 (identified individually as a first (e.g., forward) slide-pivot connection 92a and a second (e.g., aft) slide-pivot connection 92b in FIGS. 10-12). The forward slide-pivot connection 92a may define the forward pivot axis 104 and the aft slide-pivot connection 92b may define the aft pivot axis 106.

In one example construction, at least one side 94 (FIG. 3) of the thrust reverser door 22 may be pivotally connected to the nacelle 16 by a pair of slide-pivot connections 92. In another example construction, both sides 94 of the thrust reverser door 22 may be pivotally connected to the nacelle 16 by a pair of slide-pivot connections 92. Only a single pair of slide-pivot connections 92 of one side 94 of the thrust reverser door 22 is shown in FIGS. 10-12.

The slide-pivot connections 92 may be configured to allow the thrust reverser door 22 to move between the plurality of positions, as shown in FIGS. 10-12, and about the first pivot axis 104 and the second pivot axis 106 (FIG. 9). Each slide-pivot connection 92 may include a linear slot 96 (identified individually as a first (e.g., forward) slot 96a and a second (e.g., aft) slot 96b in FIGS. 10-12) and a pivot link 98 (identified individually as a first (e.g., forward) pivot link 98a and a second (e.g., aft) pivot link 98b in FIGS. 10-12) coupled within the slot 96. The pivot link 98 may be slidingly received and pivotally connected within a respective slot 96. For example, the slide-pivot connection 92 may use a known type of sliding connection, such as a friction member, a bushing, a guide member, or other connection.

The first slide-pivot connection 92a may be located toward (e.g., proximate) the forward end 68 of the thrust reverser door 22 defining the forward pivot axis 104. The second slide-pivot connection 92b may be located toward and suitably spaced away from the aft end 70 of the thrust reverser door 22 defining the aft pivot axis 106. Other locations of the first slide-pivot connection 92a and/or the second slide-pivot connection 92b are also contemplated depending upon the locations of the first and second pivot axes 104, 106, and/or the configuration, geometry, and/or construction of the nacelle 16 and/or the thrust reverser door 22.

In accordance with the example construction described above, and as best shown in FIG. 10, when in the thrust reverser door 22 is in the first position, the first pivot link 98a may be positioned (e.g., seated and locked) within the first slot 96a (e.g., at an end of the first slot 96a) and the second pivot link 98b may be positioned (e.g., seated and locked) within the second slot 96b (e.g., at an end of the second slot 96b).

As best shown in FIG. 11, to move the thrust reverser door 22 to the second position, the actuator 76 may extend the actuator rod 80 in the direction indicated at $D_1$ to move the first pivot link 98a relative to the first slot 96a. The second pivot link 98b may remain seated and locked within a second end 102b of the second slot 96b. The first pivot link 98a may be released and move within the first slot 96a toward a first end 100a in response to extension of the actuator rod 80 and pivoting of the thrust reverser door 22 about the second pivot link 98b (e.g., about the aft pivot axis 106). Linear movement of the first pivot link 98a within the first slot 96a and rotation of the second pivot link 98b within the second slot 96b may cause the thrust reverse door 22 to pivot about the second pivot link 98b (e.g., the aft pivot axis 106) in the directions indicated at $P_1$ and $P_2$. The forward end 68 of the thrust reverser door 22 may pivot radially outward relative to the centerline X (FIG. 2) in the direction $P_1$ to uncover a forward portion of the reverse thrust opening 20. The aft end 70 of the thrust reverser door 22 may pivot radially inward relative to the centerline X in the direction $P_2$ to at least partially restrict the bypass airflow passage 54 and direct (e.g., discharge) the bypass airflow 58 through the reverse thrust opening 20 in the forward direction.

As best shown in FIG. 12, to move the thrust reverser door 22 to the third position, the actuator 76 may retract the actuator rod 80 in the direction indicated at $D_2$ to move the second pivot link 98b relative to the second slot 96b. The first pivot link 98a may remain seated and locked within a second end 102a of the first slot 96a. The second pivot link 98b may be released and move within the second slot 96b toward a first end 100b in response to retraction of the actuator rod 80 and pivoting of the thrust reverser door 22 about the first pivot link 98a (e.g., about the forward pivot axis 104). Linear movement of the second pivot link 98b within the second slot 96b and rotation of the first pivot link 98a within the first slot 96a may cause the thrust reverse door 22 to pivot about the first pivot link 98a (e.g., the forward pivot axis 104) in the directions indicated at $P_3$ and $P_4$. The forward end 68 of the thrust reverser door 22 may pivot radially inward relative to the centerline X (FIG. 2) in the direction $P_3$. The aft end 70 of the thrust reverser door 22 may pivot radially outward relative to the centerline X in the direction $P_4$ to uncover an aft portion of the reverse thrust opening 20 and direct (e.g., discharge) a portion of the bypass airflow 58 through the reverse thrust opening 20 in the aft direction. Thus, when in the third position, the thrust reverser door 22 may increase the cross-sectional area A of the rear exhaust 60 (e.g., outlet 30) of the nacelle 16 and increase the bypass ratio.

Various configurations of the slide-pivot connections 92 are contemplated without limitation. In one example construction, and as shown in FIGS. 10-12, the slots 96 may be disposed in the frame 82 of the nacelle 16 and the pivot links 98 may be connected to and extend outwardly from the frame 88 of the thrust reverser door 22. For example, the frame 88 of the thrust reverser door 22 may at least partially form a sidewall of the thrust reverser door 22 extending between the outer surface 72 and the inner surface 74 of the thrust reverser door 22.

In another example construction (not shown), the slots 96 may be disposed in the frame 88 of the thrust reverser door 22 and the pivot links 98 may be connected to and extend outwardly from the frame 82 of the nacelle 16.

The length of the slots 96 (e.g., the first slot 96a and/or the second slot 96b) may depend upon various factors including, but not limited to, the geometry, size, configuration and/or construction of the thrust reverser door 22 and/or the nacelle 16, the travel distance required to position the thrust reverser door 22 in the second or the third position, the position of the slots 96 relative to the thrust reverser door 22, the stoke length of the actuator 76, the locations of the first and second pivot axes 104, 106, and the like.

In one example construction, and as shown in FIGS. 10-12, the first end 100a of the first slot 96a may be open to allow the first pivot link 98a to move out from within the first slot 96a when the thrust reverser door 22 is moved into the second position. The second end 102a of the first slot 96a may be closed to provide a contact (e.g., seated) surface upon which the first pivot link 98a may pivot. Both the first end 100b and the second end 102b of the second slot 96b may be closed to retain the second pivot link 98b therewithin.

Those skilled in the art will recognize that the example construction of the pivot connections 110 (e.g., the slide-pivot connections 92) described above and illustrated in FIGS. 10-12 may be but one simple construction of the pivot mechanism 108 that allows the thrust reverser door 22 to move between the plurality of positions about the first pivot axis 104 and the second pivot axis 106. Other examples of the pivot mechanism 108 and/or the pivot connection 110 may include, but are not limited to, a single linkage operatively connected to the thrust reverser door 22 configured to allow the thrust reverser door 22 to move between the plurality of positions about the first pivot axis 104 and the second pivot axis 106, a multiple link mechanism operatively connected to the thrust reverser door 22 configured to allow the thrust reverser door 22 to move between the plurality of positions about the first pivot axis 104 and the second pivot axis 106, any other mechanism configured to allow the thrust reverser door 22 to move between the plurality of positions about the first pivot axis 104 and the second pivot axis 106, or a combination thereof.

Figure 13:
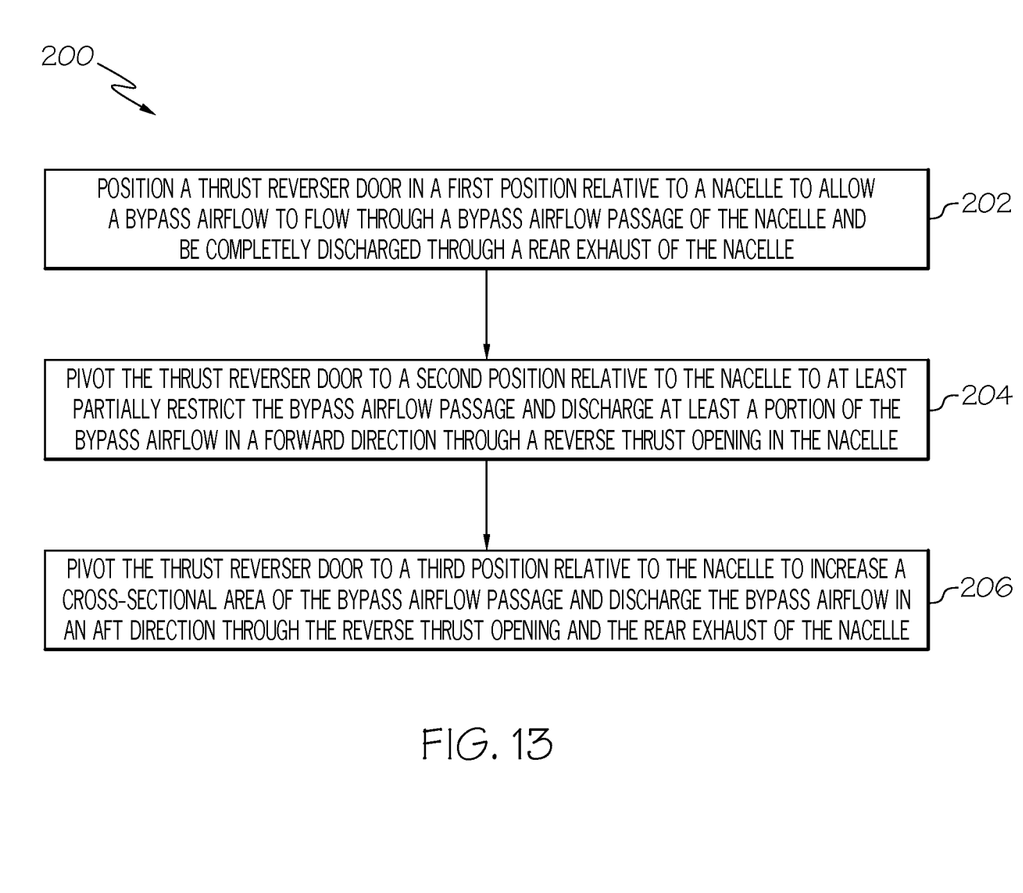
FIG. 13 is a flow diagram of the disclosed method for controlling a bypass airflow through the nacelle of the aircraft engine system.

Referring to FIG. 13, and with reference to FIGS. 9-12, the disclosed method, generally designated 200, for controlling a bypass airflow through the nacelle 16 of an aircraft engine system may include positioning the thrust reverser door 22 in the first position (e.g., FIG. 10) relative to the nacelle 16 (e.g., the outer cowling 34) to allow the bypass airflow 58 to flow through the bypass airflow passage 54 of the nacelle 16 and be completely discharged through the rear exhaust 60 of the nacelle 16, as shown at block 202.

As shown at block 204, the thrust reverser door 22 may be pivoted to the second position (e.g., FIG. 11) relative to the nacelle 16 (e.g., the outer cowling 34) by pivoting the thrust reverser door 22 about the aft pivot axis 106 (FIG. 9) to at least partially restrict the bypass airflow passage 54 and discharge at least a portion of the bypass airflow 58 in the forward direction through the reverse thrust opening 20 in the nacelle 16 (e.g., in the outer cowling 34 of the nacelle 16).

Pivoting the thrust reverser door 22 to the second position may include positioning the forward end 68 of the thrust reverser door 22 radially outward relative to the centerline X (FIG. 2) to uncover a forward portion of the reverse trust opening 20 and positioning the aft end 70 of the thrust reverser door 22 radially inward relative to the centerline X and at least partially within the bypass airflow passage 54.

As shown at block 206, the thrust reverser door 22 may be pivoted to the third position (e.g., FIG. 12) relative to the nacelle 16 (e.g., the outer cowling 34) by pivoting the thrust reverser door 22 about the forward pivot axis 104 (FIG. 9) to increase the cross-sectional area A of the bypass airflow passage 54 and discharge the bypass airflow 58 in the aft direction through the reverse thrust opening 20 and the rear exhaust 60 of the nacelle 16.

Pivoting the thrust reverser door 22 to the third position may include positioning the aft end 70 of the thrust reverser door 22 radially outward relative to the centerline X (FIG. 2) to uncover an aft portion of the reverse thrust opening 20.

Although various embodiments of the disclosed system and method have been shown and described, modifications may occur to those skilled in the art upon reading the specification. The present application includes such modifications and is limited only by the scope of the claims.

What is claimed is:

1. A thrust reverse variable area nozzle system for a nacelle of an aircraft engine system, said system comprising:
    a reverse thrust opening disposed in said nacelle; and
    a thrust reverser door movably coupled to said nacelle for selectively covering said reverse thrust opening, said thrust reverser door comprising a forward end and an aft end;
    a first slide-pivot connection selectively connecting said thrust reverser door and said nacelle and comprising a first slot, having an open first end and a closed second end, and a first pivot link movable within said first slot; and
    a second slide-pivot connection selectively connecting said thrust reverser door and said nacelle and comprising a second slot, having a closed first end and a closed second end, and a second pivot link movable within said second slot; and
    wherein said thrust reverser door is pivotally movable between:
        a first position, in which said first pivot link is seated in said closed second end of said first slot and said second pivot link is seated in said closed second end of said second slot and said thrust reverser door completely covers said reverse thrust opening;
        a second position, in which said first pivot link is removed from said first slot through said open first end of said first slot and said second pivot link is seated in said closed second end of said second slot and said thrust reverser door pivots about said second pivot link to position said forward end of said thrust reverser door radially outward and said aft end of said thrust reverser door radially inward to partially uncover a forward portion of said reverse thrust opening; and
        a third position, in which said first pivot link is seated in said closed second end of said first slot and said second pivot link is seated in said closed first end of said second slot and said thrust reverser door pivots about said first pivot link to position said aft end of said thrust reverser door radially outward to partially uncover an aft portion of said reverse thrust opening.

2. The system of claim 1 further comprising a pivot mechanism operable to control movement of the thrust reverser door between said first position, said second position, and said third position.

3. The system of claim 2 wherein said pivot mechanism comprises
    an actuator coupled to said thrust reverser door to selectively control pivotal motion of said thrust reverser about one of the first pivot link or said second pivot link.

4. The system of claim 3, wherein said actuator comprises a linear actuator.

5. The system of claim 1 wherein each one of said first slot and said second slot is linear.

6. The system of claim 1 wherein:
said nacelle comprises a nacelle frame;
said thrust reverser door comprises a door frame;
said first slot is located in one of said nacelle frame or said door frame;
said first pivot link is located on an opposing one of said nacelle frame or said door frame;
said second slot is located in said one of said nacelle frame or said door frame; and
said second pivot link is located on said opposing one of said nacelle frame or said door frame.

7. The system of claim 1 wherein:
said first slide-pivot connection is located toward said forward end of said thrust reverser door and defines a forward pivot axis of said thrust reverser door; and
said second slide-pivot connection is spaced away from said aft end of said thrust reverser door and defines an aft pivot axis of said thrust reverser door.

8. The system of claim 1 wherein:
said forward pivot axis is defined through said thrust reverser door and is fixed relative to said nacelle; and
said aft pivot axis is defined through said thrust reverser door and is fixed relative to said nacelle.

9. The system of claim 1 wherein:
with said thrust reverser door in said second position, a bypass airflow, passing through said nacelle, is at least partially discharged through said forward portion of said reverse thrust opening in a forward direction; and
with said thrust reverser door in said third position, said bypass airflow is at least partially discharged through said aft portion of said reverse thrust opening in an aft direction.

10. An engine system for an aircraft, said system comprising:
an engine;
a nacelle comprising an inner cowling extending circumferentially around said engine and an outer cowling extending circumferentially around said inner cowling;
a bypass airflow passage defined between said inner cowling and said outer cowling;
a reverse thrust opening disposed in said outer cowling and in fluid communication with said bypass airflow passage; and
a thrust reverser door movably coupled to said outer cowling for selectively covering said reverse thrust opening, said thrust reverser door comprising a forward end and an aft end, opposite said forward end;
a first slide-pivot connection selectively connecting said thrust reverser door and said nacelle and comprising a first slot, having an open first end and a closed second end, and a first pivot link movable within said first slot; and
a second slide-pivot connection selectively connecting said thrust reverser door and said nacelle and comprising a second slot, having a closed first end and a closed second end, and a second pivot link movable within said second slot; and
wherein said thrust reverser door is pivotally movable between:
a first position, in which said first pivot link is seated in said closed second end of said first slot and said second pivot link is seated in said closed second end of said second slot and said thrust reverser door completely covers said reverse thrust opening;
a second position, in which said first pivot link is removed from said first slot through said open first end of said first slot and said second pivot link is seated in said closed second end of said second slot and said thrust reverser door pivots about said second pivot link to position said forward end of said thrust reverser door radially outward and said aft end of said thrust reverser door radially inward, within said bypass airflow passage, to partially uncover a forward portion of said reverse thrust opening; and
a third position, in which said first pivot link is seated in said closed second end of said first slot and said second pivot link is seated in said closed first end of said second slot and said thrust reverser door pivots about said first pivot link to position said aft end of said thrust reverser door radially outward to partially uncover an aft portion of said reverse thrust opening.

11. The system of claim 10 further comprising a pivot mechanism operatively coupled to said thrust reverser door and to said nacelle to selectively control pivotal motion of the thrust reverser door, about one of the first pivot link or said second pivot link, between said first position, said second position, and said third position.

12. The system of claim 11 wherein said pivot mechanism comprises: a linear actuator connected to said thrust reverser door.

13. The system of claim 10 wherein:
said first slide-pivot connection is located proximate to said forward end of said thrust reverser door and defines a forward pivot axis of said thrust reverser door; and
a second slide-pivot connection is spaced away from said aft end of said thrust reverser door and defines and aft pivot axis of said thrust reverser door.

14. The system of claim 10 wherein at least one of
said first slot
and
said second slot
is linear.

15. The system of claim 10 wherein:
said first pivot link moves linearly within said first slot and said second pivot link rotates within said second slot when said thrust reverser door moves to said second position, and
said second pivot link moves linearly within said second slot and said first pivot link rotates within said first slot when said thrust reverser door moves to said third position.

16. The system of claim 10 wherein:
with said thrust reverser door in said second position, a bypass airflow, passing through said bypass airflow passage, is at least partially discharged through said forward portion of said reverse thrust opening in a forward direction; and
with said thrust reverser door in said third position, a cross-sectional area of said bypass airflow passage is increased and said bypass airflow is at least partially discharged through said aft portion of said reverse thrust opening in an aft direction.

17. A method for controlling a bypass airflow through a nacelle of an aircraft engine system, said method comprising:
positioning a thrust reverser door in a first position relative to said nacelle, in which a first pivot link is seated in a closed second end of a first slot and a second pivot link is seated in a closed second end of a second slot to completely cover a reverse thrust opening disposed in said nacelle and in fluid communication with a bypass airflow passage of said nacelle;

pivoting said thrust reverser door about an aft pivot axis, defined through said thrust reverser door and fixed relative to said nacelle, to position said thrust reverser door in a second position relative to said nacelle, in which said first pivot link is removed from said first slot through an open first end of said first slot and said second pivot link is seated in said closed second end of said second slot and a forward end of said thrust reverser door is positioned radially outward and an aft end of said thrust reverser door is positioned radially inward within said bypass airflow passage to partially uncover a forward portion of said reverse thrust opening; and pivoting said thrust reverser door about a forward pivot axis, defined through said thrust reverser and fixed relative to said nacelle, to position said thrust reverser door in a third position relative to said nacelle, in which said first pivot link is seated in said closed second end of said first slot and said second pivot link is seated in a closed first end of said second slot and said aft end of said thrust reverser door is positioned radially outward to partially uncover an aft portion of said reverse thrust opening.

18. The method of claim 17 further comprising selectively controlling pivotal movement of said thrust reverser door between said first position, said second position, and said third position using an actuator operatively coupled with said thrust reverser door.

19. The method of claim 17 further comprising:
with said thrust reverser door in said second position, discharging at least a portion of said bypass airflow in a forward direction through said forward portion of said reverse thrust opening; and
with said thrust reverser door in said third position, discharging at least a portion of said bypass airflow in an aft direction through said aft portion of said reverse thrust opening.

20. The method of claim 17 further comprising:
with said thrust reverser door in said second position, at least partially restricting said bypass airflow passage; and
with said thrust reverser door in said third position, increasing a cross-sectional area of said bypass airflow passage.

* * * * *